United States Patent
Mariani et al.

(10) Patent No.: US 7,486,786 B2
(45) Date of Patent: Feb. 3, 2009

(54) APPARATUS AND METHOD FOR PERFORMING IMPEDANCE SYNTHESIS IN A TRANSMITTER

(75) Inventors: Giorgio Mariani, Phoenix, AZ (US); Krishna B. Thirunagari, Glendale, AZ (US)

(73) Assignee: STMicroelectronics, Inc., Carrollton, TX (US)

( * ) Notice: Subject to any disclaimer, the term of this patent is extended or adjusted under 35 U.S.C. 154(b) by 250 days.

(21) Appl. No.: 10/953,703

(22) Filed: Sep. 29, 2004

(65) Prior Publication Data

US 2006/0067514 A1      Mar. 30, 2006

(51) Int. Cl.
*H04M 7/04*      (2006.01)
(52) U.S. Cl. ..................................... 379/398
(58) Field of Classification Search ................... 379/398
See application file for complete search history.

(56) References Cited

U.S. PATENT DOCUMENTS

| | | | | |
|---|---|---|---|---|
| 4,782,507 A | * | 11/1988 | Siligoni et al. | 379/27.01 |
| 6,137,356 A | * | 10/2000 | Sakuragi | 330/86 |
| 6,906,426 B2 | * | 6/2005 | Sefidvash | 257/778 |
| 6,970,515 B1 | * | 11/2005 | Bicakci et al. | 375/257 |
| 7,190,194 B2 | * | 3/2007 | Nagahori et al. | 327/110 |
| 7,194,037 B1 | * | 3/2007 | Sutardja | 375/258 |
| 2001/0016021 A1 | * | 8/2001 | Chan | 375/346 |
| 2004/0053579 A1 | * | 3/2004 | Ferianz | 455/73 |

* cited by examiner

*Primary Examiner*—Md S Elahee
(74) *Attorney, Agent, or Firm*—Lisa K. Jorgenson; William A. Munck

(57) ABSTRACT

A method includes generating an output signal at a transmitter using an input signal. The method also includes providing the output signal for communication over a communication link. The method further includes identifying a return signal by at least partially removing from the output signal at least one of: the communicated signal and base line wander. In addition, the method includes establishing a synthesized impedance to the return signal.

17 Claims, 3 Drawing Sheets

APPARATUS AND METHOD FOR PERFORMING IMPEDANCE SYNTHESIS IN A TRANSMITTER

TECHNICAL FIELD

This disclosure is generally directed to communication systems and more specifically to an apparatus and method for performing impedance synthesis in a transmitter.

BACKGROUND

Conventional transmitters and receivers often communicate over transmission lines. For example, a transmitter may communicate with a receiver over an Ethernet cable. In conventional communication systems, a signal transmitted from a transmitter to a receiver over a transmission line is partially reflected back to the transmitter. To help minimize reflection, the impedance of the transmitter typically needs to match the characteristic impedance of the transmission line.

Several techniques have been developed to match the impedance of a transmitter to the characteristic impedance of a transmission line. However, these approaches typically suffer from a number of problems. For example, some techniques suffer from current or voltage loss and are sensitive to process variations during the manufacturing process. Also, some techniques require more complex circuitry that is external to the transmitting circuitry, which increases the size and complexity of the transmitter.

SUMMARY

This disclosure provides an apparatus and method for performing impedance synthesis in a transmitter.

In one aspect, a method includes generating an output signal at a transmitter using an input signal. The method also includes providing the output signal for communication over a communication link. The method further includes identifying a return signal by at least partially removing from the output signal at least one of: the communicated signal and base line wander. In addition, the method includes establishing a synthesized impedance to the return signal.

In another aspect, a transmitter includes one or more amplifiers capable of receiving one or more input signals and generating one or more output signals. The one or more output signals are provided for communication over a communication link. The transmitter also includes an impedance synthesizer capable of identifying a return signal and establishing a synthesized impedance to the return signal. The return signal is identified by at least partially removing from the output signal at least one of: the communicated signal and base line wander.

In yet another aspect, an impedance synthesizer includes circuitry capable of receiving an output signal produced by a transmitter and identifying a return signal by at least partially removing from the output signal at least one of: a communicated signal and base line wander. The impedance synthesizer also includes circuitry capable of establishing a synthesized impedance to the return signal.

In still another aspect, a method includes generating an output signal at a transmitter using an input signal. The method also includes providing the output signal for communication over a communication link. In addition, the method includes establishing a synthesized impedance using an impedance synthesizer while at least partially compensating for a direct current shift to the impedance synthesizer.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
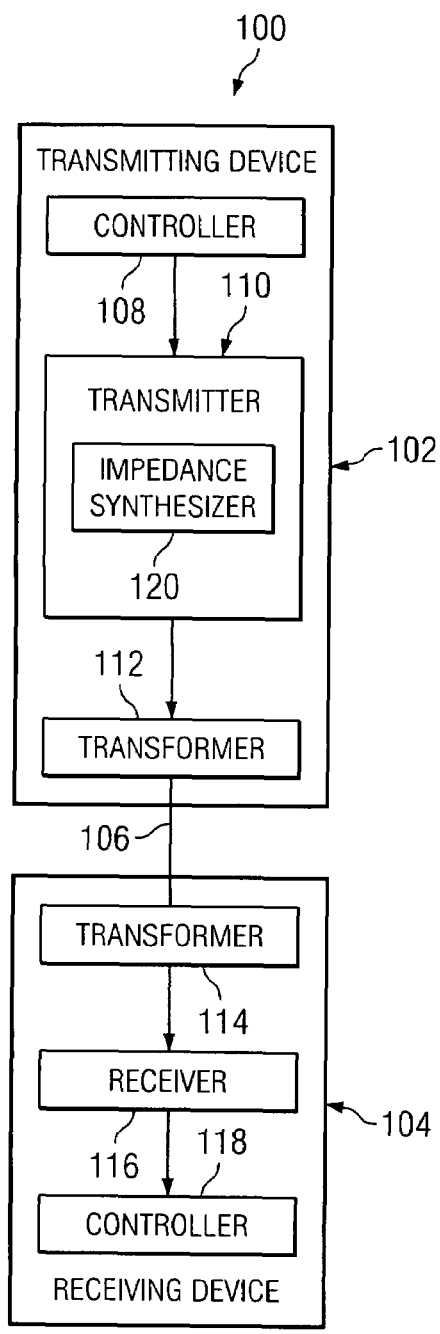
FIG. 1 illustrates an example communication system according to one embodiment of this disclosure.

FIG. 1 illustrates an example communication system 100 according to one embodiment of this disclosure. In this example embodiment, the system 100 includes a transmitting device 102, a receiving device 104, and a communication link 106. This embodiment of the system 100 is for illustration only. Other embodiments of the system 100 may be used without departing from the scope of this disclosure.

The transmitting device 102 is coupled to the communication link 106. In this document, the term "couple" and its derivatives refer to any direct or indirect communication between two or more elements, whether or not those elements are in physical contact with one another. The transmitting device 102 represents any device capable of communicating over the communication link 106. For example, the transmitting device 102 could represent a computing device capable of communicating using the Ethernet protocol, such as a desktop computer, laptop computer, server computer, or other device. The transmitting device 102 includes any hardware, software, firmware, or combination thereof for transmitting information over a communication link 106.

In the illustrated example, the transmitting device 102 includes a controller 108, a transmitter 110, and a transformer 112. The controller 108 represents any controller capable of generating or otherwise providing information to be transmitted over the communication link 106. For example, the controller 108 could represent a microprocessor, digital signal processor ("DSP"), application-specific integrated circuit ("ASIC"), or field-programmable gate array ("FPGA").

The transmitter 110 is coupled to the controller 108 and the transformer 112. The transmitter 110 encodes the information provided by the controller 108 and communicates a signal containing the encoded information over the communication link 106. For example, the transmitter 110 could encode information for transmission using the Multilevel Threshold-3 ("MLT3") protocol. Using this protocol, the transmitter 110 encodes information and produces an output signal having three different levels (+1, 0, and −1). Other encoding schemes could be used by the transmitter 110 without departing from the scope of this disclosure. The transmitter 110 includes any hardware, software, firmware, or combination thereof for transmitting information over a communication link 106.

The transformer 112 is coupled to the transmitter 110 and the communication link 106. The transformer 112 receives the encoded signal produced by the transmitter 110 and provides the encoded signal for transmission over the communication link 106. The transformer 112 represents any structure for coupling the transmitting device 102 to the communication link 106. As an example, the transformer 112 could couple the transmitting device 102 to an Ethernet cable.

The receiving device 104 is coupled to the communication link 106. The receiving device 104 receives information transmitted over the communication link 106 by the transmitting device 102. The receiving device 104 represents any device capable of communicating over the communication link 106. For example, the receiving device 104 could represent a computing device capable of communicating using the Ethernet protocol, such as a desktop computer, laptop computer, server computer, or other device. The receiving device 104 includes any hardware, software, firmware, or combination thereof for receiving information communicated over a communication link 106.

In the illustrated example, the receiving device 104 includes a transformer 114, a receiver 116, and a controller 118. The transformer 114 is coupled to the communication link 106 and the receiver 116. The transformer 114 receives the signal transmitted by the transmitting device 102 over the communication link 106 and provides the signal to the receiver 116. The transformer 114 represents any structure for coupling the receiving device 104 to the communication link 106. As an example, the transformer 114 could couple the receiving device 104 to an Ethernet cable.

The receiver 116 is coupled to the transformer 114 and the controller 118. The receiver 116 receives and decodes the signal transmitted by the transmitting device 102 over the communication link 106. The receiver 116 then provides the information contained in the decoded signal to the controller 118. The receiver 116 includes any hardware, software, firmware, or combination thereof for receiving information over a communication link 106.

The controller 118 is coupled to the receiver 116. The controller 118 is capable of receiving and processing the decoded information received over the communication link 106. For example, the controller 118 could represent a microprocessor, DSP, ASIC, or FPGA.

The communication link 106 couples the transmitting device 102 and the receiving device 104. The communication link 106 represents any communication link 106 capable of transferring information between the transmitting device 102 and the receiving device 104. For example, the communication link 106 could represent a twisted-pair cable, such as a category-5 ("cat-5") cable, capable of supporting communications using the Ethernet protocol.

In one aspect of operation, signals transmitted by the transmitter 110 over the communication link 106 may be partially reflected back to the transmitter 110. As a result, the transmitter 110 receives reflected or return signals. To help reduce this reflection, the transmitter 110 performs impedance synthesis in an attempt to match its impedance to the characteristic impedance of the communication link 106.

In the illustrated example, the transmitter 110 includes an impedance synthesizer 120. The impedance synthesizer 120 is capable of synthesizing the appropriate impedance for the transmitter 110 so that signal reflection is reduced or minimized. For example, the impedance synthesizer 120 could operate so that the impedance of the transmitter 110 matches or significantly matches the characteristic impedance of the communication link 106. This may allow, for example, the transmitter 110 to meet appropriate standards regarding signal reflection. As an example, if the transmitter 110 implements the 100 BT Ethernet protocol, the impedance synthesizer 120 allows the transmitter 110 to meet the appropriate return loss specification. In addition, the impedance synthesizer 120 may adjust the impedance of the transmitter 110 as conditions in the system 100 change.

In some embodiments, the impedance synthesizer 120 is capable of matching the impedances of the transmitter 110 and the communication link 106 while compensating for "base line wander." During transmission, it is possible to have long streams of the same value in the transmitted signal. For example, a transmitted signal could have long streams of ones or zeros. These long streams typically lead to a direct current ("DC") shift in the signals received by the impedance synthesizer 120. Conventional transmitters that implement internal impedance synthesis may operate incorrectly when DC shift occurs. In particular, the DC shift may be viewed by a conventional transmitter as a reflected or return signal, which causes the conventional transmitter to improperly adjust its impedance. The impedance synthesizer 120 in the transmitter 110 matches the impedances of the transmitter 110 and the communication link 106 while compensating for any DC shift.

The transmitter 110 and the associated impedance synthesizer 120 may be implemented using any suitable technology. For example, the transmitter 110 and the impedance synthesizer 120 could be constructed using Complementary Metal Oxide Semiconductor ("CMOS") technology.

Although FIG. 1 illustrates one example of a communication system 100, various changes may be made to FIG. 1. For example, other embodiments of the transmitting device 102 and/or the receiving device 104 could be used in the system 100. Also, the devices 102-104 have been labeled as "transmitting" and "receiving" for ease of illustration and explanation. One or both of the devices 102-104 could be capable of both transmitting and receiving information over the communication link 106.

Figure 2:
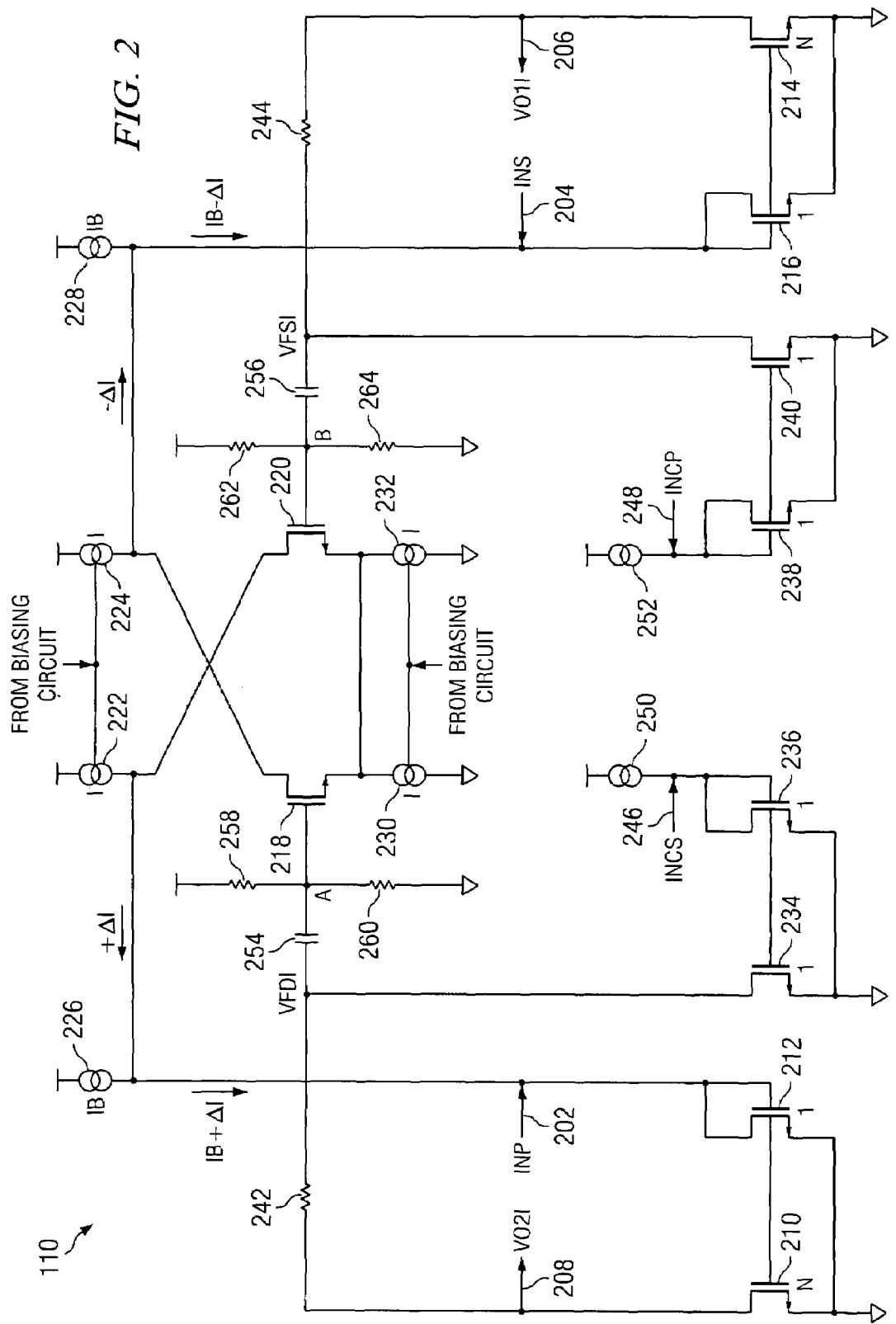
FIG. 2 illustrates an example transmitter for performing impedance synthesis according to one embodiment of this disclosure.

FIG. 2 illustrates an example transmitter 110 for performing impedance synthesis according to one embodiment of this disclosure. The embodiment of the transmitter 110 shown in FIG. 2 is for illustration only. Other embodiments of the transmitter 110 may be used without departing from the scope of this disclosure. Also, for ease of explanation, the transmitter 110 is described as operating in the system 100 of FIG. 1. The transmitter 110 could be used in any other suitable environment.

In this example embodiment, the transmitter 110 receives two input signals at two inputs 202-204 and produces two output signals at two outputs 206-208. The transmitter 110 may also receive reflected signals through the outputs 206-208, where the reflected signals represent reflections of signals that have been transmitted by the transmitter 110. In some embodiments, the transmitter 110 operates in "current mode," where the input signals represent currents. Also, in some embodiments, the output signals represent voltages provided by the transmitter 110 to the transformer 112 in the transmitting device 102. As a particular example, the input signals and the output signals may represent currents and voltages, respectively, where the currents and voltages have the shape specified by the MLT3 protocol.

In the illustrated example, the transmitter 110 includes four transistors 210-216. The transistors 210-216 act as current amplifiers for the input signals received at the inputs 202-204. In this embodiment, the transistors 210-216 act as N:1 current amplifiers, where the transistors 210-216 receive the input signals and amplify the input signals by a factor of N. Voltages at the drains of the transistors 210, 214 are used as the output signals provided at the outputs 206-208. The transistors 210-216 represent any suitable transistors, such as n-type transistors.

Figure 3:
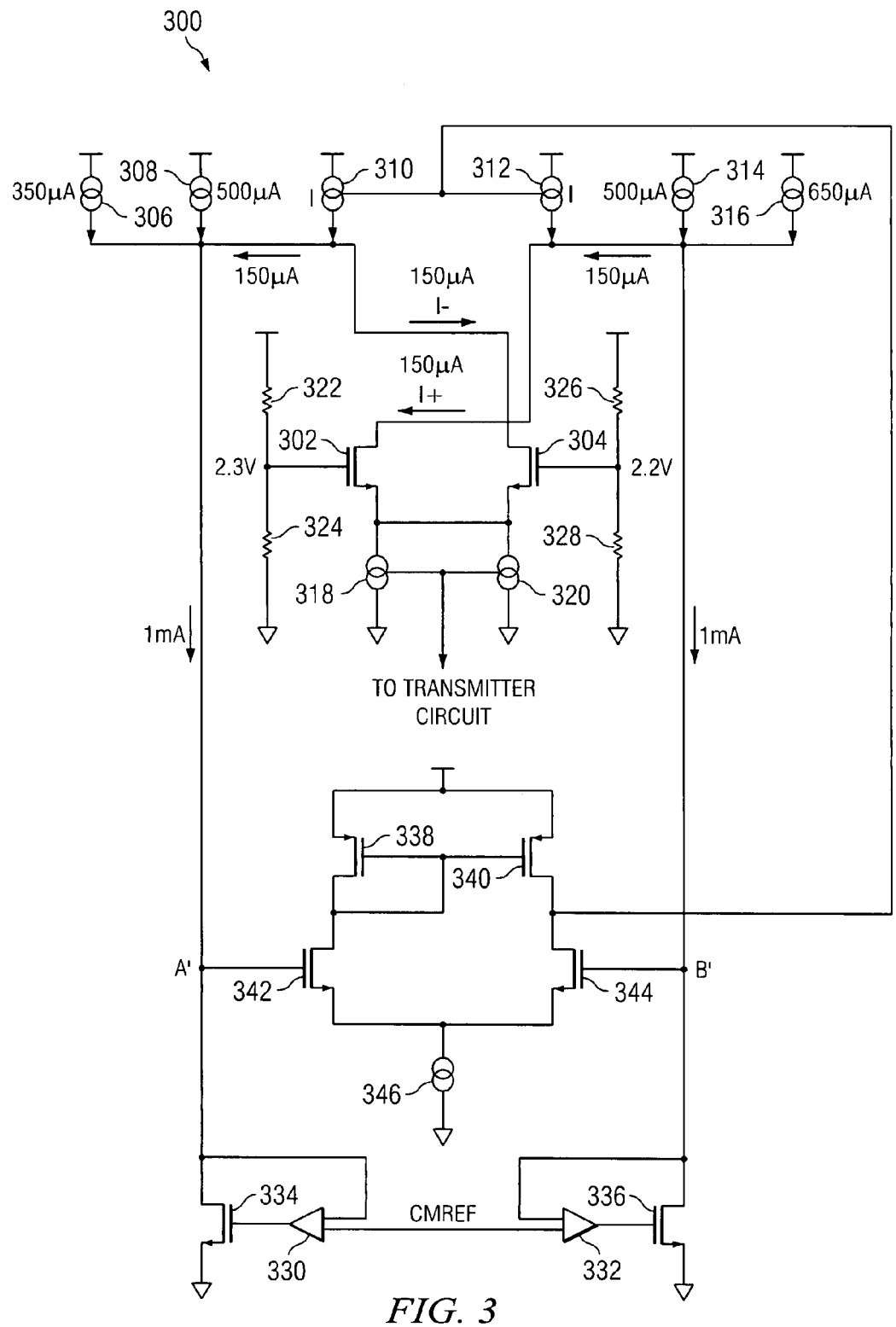
FIG. 3 illustrates an example bias circuit for a transmitter capable of performing impedance synthesis according to one embodiment of this disclosure.

The remaining components of the transmitter 110 shown in FIG. 2 implement the impedance synthesizer 120 of FIG. 1. In this example, the impedance synthesizer 120 includes two transistors 218-220 and six current sources 222-232. The current sources 222-232 produce bias currents and are coupled to the sources and drains of the transistors 218-220. The current sources 222-224, 230-232 are also controlled by a biasing circuit, which is shown in FIG. 3 and described below. The transistors 218-220 represent any suitable transistors such as n-type transistors, and the current sources 222-232 represent any suitable current sources.

Each of the transistors 218-220 has an associated transconductance, and the transconductances of the transistors 218-220 may vary. In particular, the transistors 218-220 are biased by the current generators 222-224, 230-232, and the currents provided by the current generators 222-224, 230-232 may be adjusted. Adjusting the currents provided by the current generators 222-224, 230-232 alters the transconductances of the transistors 218-220. Because the impedance of the transmitter 110 is based on the transconductances of the transistors 218-220, varying the transconductances of the transistors 218-220 may vary the impedance of the transmitter 110. As a particular example, the transistors 218-220 could be biased so that each of the transistors 218-220 has a transconductance of 3 mS, providing an overall impedance of approximately 95.6 Ω. In this document, the term "each" refers to every of at least a subset of the identified items.

In order to perform impedance synthesis, the transmitter 110 removes the actual transmitted signals from the signal provided to the gates of the transistors 218-220. To reduce or eliminate the actual transmitted signals from the gates of the transistors 218-220, the transmitter 110 includes four transistors 234-240 and two resistors 242-244. The four transistors 234-240 receive two additional input signals 246-248 and currents from two current sources 250-252. The input signals 246-248 are adjustable currents used to reduce or eliminate the actual transmitted signals from the gates of the transistors 218-220. The input signals 246-248 may be produced in any suitable manner.

The transistors 234-240 act as 1:1 current mirrors, where the currents injected into the transistors 236-238 are mirrored by the transistors 234, 240. This allows the transmitted signals to be removed at nodes VFDI and VFSI in the transmitter 110. As a result, the gates of the transistors 218-220 do not receive the transmitted signals but only the reflected or return signals.

As described above, the impedance synthesizer 120 may also compensate for base line wander to the inputs of the impedance synthesizer 120 caused by long streams of the same value in the transmitted signals. To accommodate base line wander, the impedance synthesizer 120 includes two capacitors 254-256. As explained above, the transistors 234-240 and the resistors 242-244 remove the transmitted signals at nodes VFDI and VFSI. However, a DC shift in the transmitted signals may still be present at nodes VFDI and VFSI. The two capacitors 254-256 help to remove this DC shift so that there is little or no DC shift at nodes A and B.

As shown in FIG. 2, the impedance synthesizer 120 further includes four resistors 258-264. The resistors 258-264 are coupled to the gates of the transistors 218-220. The various resistors and capacitors in the impedance synthesizer 120 may have any suitable resistance(s) and capacitance(s). For example, each of the resistors 242-244 could have a resistance of 750 Ω, and each of the capacitors 254-256 could have a capacitance of 3 pF. Also, values for the resistors 242-244, 258-264 and the capacitors 254-256 could be selected so that the networks formed by the resistors and capacitors do not interfere with the frequency of interest for the return loss. As a particular example, values for the resistors 242-244, 258-264 and the capacitors 254-256 may be selected so that the networks do not interfere with frequencies in a range between 2 MHz and 80 MHz.

In particular embodiments, an attenuation of about −1.2 db (0.871) may exist between the outputs 206-208 where the output signals are provided and the gates of the transistors 218-220. This attenuation is translated into currents at the sources of the transistors 218-220, which are represents as:

$$I = (gm \cdot dV \cdot 0.871) \tag{1}$$

where I represents the current, gm represents the transconductance of the transistors 218-220, and V represents the voltage at the gates of the transistors 218-220.

These currents are reflected into transistors 212, 216. If the transistors 210-216 provide a gain of N, the impedance seen at the outputs 206-208 of the transmitter 110 is defined as:

$$Z = \frac{1}{gm \cdot 0.871 \cdot N} \tag{2}$$

where Z represents the impedance. In particular embodiments, N equals 8, and the transistors 218-220 have a transconductance of 3 ms. Equation (2) may then be rewritten as:

$$Z = \frac{1}{0.003 \cdot 0.871 \cdot 8} = 47.8 \, \Omega. \tag{3}$$

Based on this, an impedance of 95.6 Ω is differentially seen by the transmitter 110. This would satisfy the return loss requirements for a 100 BT Ethernet transmitter.

Although FIG. 2 illustrates one example of a transmitter 110 for performing impedance synthesis, various changes may be made to FIG. 2. For example, other embodiments of the transmitter 110 may be used. Also, various components of the transmitter 110 may be replaced by other components that perform corresponding functions.

FIG. 3 illustrates an example bias circuit 300 for a transmitter 110 capable of performing impedance synthesis according to one embodiment of this disclosure. The embodiment of the bias circuit 300 shown in FIG. 3 is for illustration only. Other embodiments of the bias circuit 300 may be used without departing from the scope of this disclosure. Also, for ease of explanation, the bias circuit 300 is described as operating in conjunction with the transmitter 110 of FIG. 2. The bias circuit 300 could be used in any other suitable environment.

The bias circuit 300 shown in FIG. 3 generates the appropriate current to control the current generators 222-224, 230-232 of FIG. 2, which bias the transistors 218-220 of FIG. 2. In particular embodiments, the bias circuit 300 generates the appropriate current needed to bias the transistors 218-220 around 3 mS. Other embodiments of the bias circuit 300 that bias the transistors 218-220 in other amounts may also be used in the transmitter 110.

As shown in FIG. 3, the bias circuit 300 includes two transistors 302-304, eight current sources 306-320, and four resistors 322-328. The transistors 302-304 may represent any suitable transistors, such as n-type transistors. In particular embodiments, the transistors 302-304 in the bias circuit 300 have the same dimensions as the transistors 218-220 in the transmitter 110. The current sources 306-320 may represent any suitable current sources, and the resistors 322-328 may represent any suitable resistors having any suitable resistance(s).

In this example, the gates of the transistors 302-304 have a voltage differential of 0.1V. Also, the current sources 306-316 provide currents to the drains of the transistors 302-304, where the currents have a difference of 300 μA (±150 μA).

The bias circuit 300 also includes two operational amplifiers ("op-amps") 330-332 and two transistors 334-336. The op-amps 330-332 may represent any suitable op-amps, and the transistors 334-336 may represent any suitable transistors such as n-type transistors. The op-amps 330-332 and the transistors 334-336 force the voltages at nodes A' and B' to have the same voltage as a reference voltage (CMREF). This helps to ensure that the current sources 306-316 and the transistors 334-336 operate in saturation.

The bias circuit 300 further includes four transistors 338-344 and a current source 346. The transistors 338-344 may represent any suitable transistors such as n-type transistors, and the current source 346 may represent any suitable current source. The transistors 338-344 and current source 346 are used to control the biasing of the transistors 302-304. In particular, the transistors 338-344 and current source 346 may control the biasing of the transistors 302-304 so that their bias current settles at a value that makes the mean transconductance of the transistors 302-304 equal to:

$$gm = \frac{300 \ \mu A}{0.1 \ V} = 3 \ mS. \quad (4)$$

In particular embodiments, a loop including the current sources 306-316 and the transistors 342-344 is constantly active. This may help to ensure that the mean transconductance of the transistors 302-304 remains at 3 mS. This also generates a bias current I that is provided to the transmitter 110, which helps to automatically adjust the impedance of the transmitter 110.

Although FIG. 3 illustrates one example of a bias circuit 300 for a transmitter 110 capable of performing impedance synthesis, various changes may be made to FIG. 3. For example, FIG. 3 illustrates particular values for voltages in the bias circuit 300 and currents produced by some of the current sources. These values are for illustration only. Other embodiments of the bias circuit 300 that use different currents and voltages to produce the same mean transconductance value for the transistors 302-304 could be used. Also, other embodiments of the bias circuit 300 that produce different mean transconductance values for the transistors 302-304 could be used.

Figure 4:
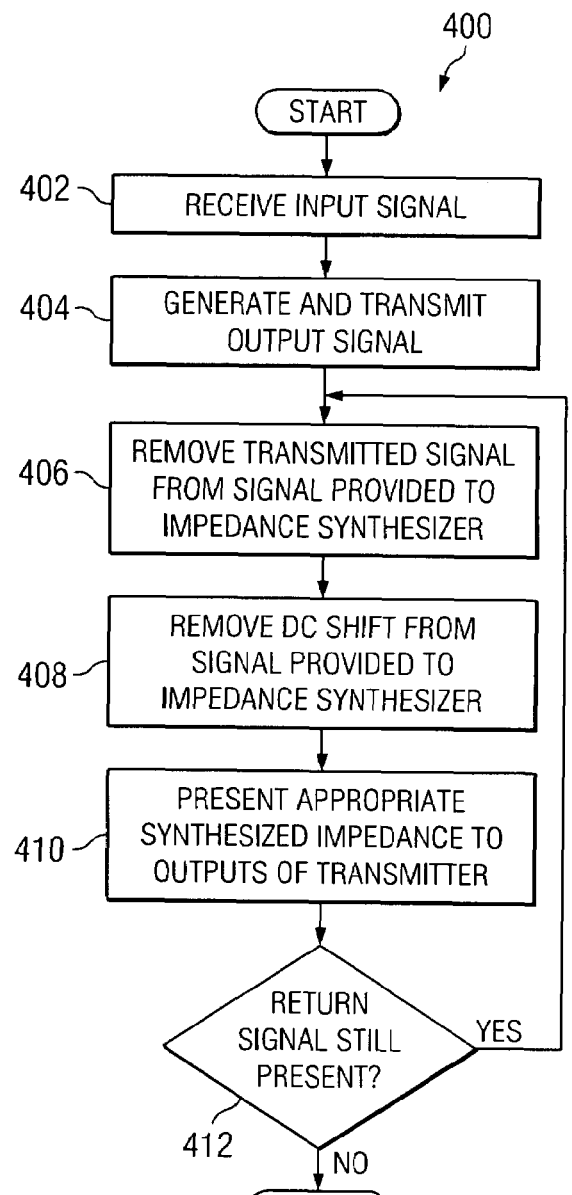
FIG. 4 illustrates an example method for performing impedance synthesis according to one embodiment of this disclosure.

FIG. 4 illustrates an example method 400 for performing impedance synthesis according to one embodiment of this disclosure. For ease of explanation, the method 400 is described with respect to the transmitter 110 of FIG. 2 operating in the system 100 of FIG. 1. The method 400 could be used by any other device and in any other system.

The transmitter 110 receives an input signal at step 402. This may include, for example, the transmitter 110 receiving input signals at the inputs 202-204 from a controller 108 or other source of information in the transmitting device 102.

The transmitter 110 generates and transmits an output signal at step 404. This may include, for example, the transmitter 110 amplifying the input signals by a factor of N using the transistors 210-216. This may also include the transmitter 110 providing the amplified input signals as the output signals at the outputs 206-208. This may further include transmitting the output signals over the communication link 106. In addition, this may include the transmitter 110 receiving reflected or return signals at the outputs 206-208.

The transmitter 110 removes a transmitted signal from signals provided to the impedance synthesizer 120 at step 406. This may include, for example, the transmitter 110 providing input signals 246-248 to the transistors 234-240 and the transistors 234-240 mirroring the input signals 246-248. This may also include the mirrored input signals 246-248 removing the transmitted signals from the signals provided to the impedance synthesizer 120 at nodes VFDI and VFSI.

The transmitter 110 removes DC shift from signals provided to the impedance synthesizer 120 at step 408. This may include, for example, the capacitors 254-256 removing the effects of base line wander from the signals at nodes VFDI and VFSI.

At this point, the effects of the transmitted signal as well as its base line wander have been removed from the signals provided to the gates of the transistors 218-220. As a result, the gates of the transistors 218-220 receive only the reflected or return signal received at the outputs 206-208 of the transmitter. The transmitter 110 then presents an appropriate synthesized impedance to the outputs 206-208 of the transmitter 110 at step 410. This may include, for example, setting the transistors 218-220 to a selected transconductance based on the biasing provided by the bias circuit 300. The selected transconductance of the transistors 218-220 is used to provide the necessary impedance for the transmitter 110.

If the transmitter 110 continues to receive the return signal at step 412, the transmitter 110 returns to step 406 to continue presenting the appropriate impedance to the return signal. In this way, the transmitter 110 may continuously provide the appropriate synthesized impedance.

Although FIG. 4 illustrates one example of a method 400 for performing impedance synthesis, various changes may be made to FIG. 4. For example, although illustrated as sequential steps, various steps in the method 400 may be performed in parallel. As a particular example, the transmitter 110 could constantly receive a return signal and adjust its impedance as defined in the step 408-412 as the output signal is being generated.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   generating an output signal at a transmitter using an input signal;
   providing the output signal for communication over a communication link;
   identifying a return signal by at least partially removing from the output signal at least one of: the communicated signal and base line wander; and
   establishing a synthesized impedance to the return signal, wherein establishing the synthesized impedance includes
   providing the return signal to gates of a plurality of transistors, and
   providing bias currents to sources and drains of the plurality of transistors.

2. The method of claim 1, wherein:
   the input signal comprises a plurality of input signals;
   the output signal comprises a plurality of output signals; and
   generating the output signal comprises amplifying the plurality of input signals to produce the plurality of output signals.

3. The method of claim 2, wherein identifying the return signal comprises:
   providing the plurality of output signals to a plurality of nodes through a plurality of resistors;
   mirroring a second plurality of input signals associated with a plurality of communicated signals; and
   providing the mirrored second plurality of input signals to the plurality of nodes, the mirrored second plurality of input signals at least partially removing the communicated signals from the plurality of output signals.

4. The method of claim 2, wherein identifying the return signal comprises providing the plurality of output signals to a plurality of capacitors, the plurality of capacitors at least partially removing base line wander from the plurality of output signals.

5. The method of claim 1, further comprising adjusting the bias currents to alter transconductances of the plurality of transistors;
   wherein the synthesized impedance is at least partially based on the transconductances of the plurality of transistors.

6. The method of claim 1, further comprising continuously providing the appropriate synthesized impedance.

7. The method of claim 1, wherein:
   the transmitter comprises a 100 BT transmitter;
   the impedance satisfies a return loss specification for 100 BT transmission; and
   providing the output signal for communication over the communication link comprises providing the output signal to a transformer coupled to an Ethernet cable.

8. A transmitter, comprising:
   one or more amplifiers capable of receiving one or more input signals and generating one or more output signals, the one or more output signals provided for communication over a communication link; and
   an impedance synthesizer capable of identifying a return signal and establishing a synthesized impedance to the return signal, the return signal identified by at least partially removing from the output signal at least one of: the communicated signal and base line wander,
   wherein the impedance synthesizer comprises a plurality of transistors, gates of the plurality of transistors capable of receiving the return signal, sources and drains of the transistors capable of receiving a plurality of bias currents.

9. The transmitter of claim 8, wherein the impedance synthesizer comprises:
   a plurality of resistors coupled to the one or more amplifiers and to a plurality of nodes; and
   a plurality of current mirrors coupled to the plurality of nodes, the plurality of current mirrors capable of mirroring a second plurality of input signals associated with a plurality of communicated signals.

10. The transmitter of claim 9, wherein the impedance synthesizer further comprises a plurality of capacitors coupled to the plurality of nodes.

11. The transmitter of claim 8, further comprising:
    one or more bias current generators capable of generating the bias currents; and
    a bias circuit capable of adjusting the one or more bias current generators to alter the bias currents;
    wherein the synthesized impedance is at least partially based on transconductances of the plurality of transistors, the transconductances of the plurality of transistors at least partially based on the bias currents.

12. The transmitter of claim 11, wherein:
    the plurality of transistors have an average transconductance of 3 mS; and
    the impedance satisfies a return loss specification for 100 BT transmission.

13. An impedance synthesizer, comprising:
    circuitry capable of receiving an output signal produced by a transmitter and identifying a return signal by at least partially removing from the output signal at least one of: a communicated signal and base line wander; and
    circuitry capable of establishing a synthesized impedance to the return signal, wherein the circuitry capable of establishing the synthesized impedance comprises a plurality of transistors having gates capable of receiving the return signal and having sources and drains capable of receiving a plurality of bias currents.

14. The impedance synthesizer of claim 13, wherein:
    the output signal comprises a plurality of output signals; and
    the circuitry capable of identifying the return signal comprises:
    a plurality of resistors coupled to a plurality of nodes and capable of receiving the plurality of output signals;
    a plurality of current mirrors coupled to the plurality of nodes, the plurality of current mirrors capable of mirroring a plurality of input signals associated with a plurality of communicated signals; and
    a plurality of capacitors coupled to the plurality of nodes.

15. The impedance synthesizer of claim 13, wherein the circuitry capable of establishing the synthesized impedance further comprises one or more bias current generators capable of generating the bias currents.

16. The impedance synthesizer of claim 15, wherein:
    the circuitry capable of establishing the synthesized impedance further comprises a bias circuit capable of adjusting the one or more bias current generators to alter the bias currents; and
    the synthesized impedance is at least partially based on transconductances of the plurality of transistors, the transconductances of the plurality of transistors at least partially based on the bias currents.

17. A method, comprising:
generating an output signal at a transmitter using an input signal;
providing the output signal for communication over a communication link; and
establishing a synthesized impedance using an impedance synthesizer while at least partially compensating for a direct current shift to the impedance synthesizer, wherein establishing the synthesized impedance includes
providing the return signal to gates of a plurality of transistors, and
providing bias currents to sources and drains of the plurality of transistors.

* * * * *